UNITED STATES PATENT OFFICE 2,583,096

PROCESS FOR THE PRODUCTION OF HIGH VISCOSITY HYALURONIC ACID

Zareh Hadidian, Needham, Mass., and Norman W. Pirie, Harpenden, England, assignors to G. D. Searle & Co., Chicago, Ill., a corporation of Illinois No Drawing. Application January 15, 1949, Serial No. 71,228

5 Claims. (Cl. 195—7)

This invention relates to hyaluronic acid of high viscosity and processes for the preparation thereof. It further relates to processes for preparing high viscosity hyaluronic acid by fractionation, whereby hyaluronic acid of low viscosity is separated from hyaluronic acid of high viscosity.

This application is a division of our copending application Serial No. 6,015, filed February 3, 1948.

Hyaluronic acid is a mucopolysaccharide which constitutes part of the connective tissue of cells of animals and humans. It is composed for the most part of glucuronic acid and acetylglucosamine. A specific enzyme, hyaluronidase, exists in certain bacteria, venoms, spermatazoa and other sources, and may play a role in the processes of invasion of cells and tissues by depolymerization of hyaluronic acid, the ground substance of connective tissue. A number of substances with varying properties, all called hyaluronic acid, have been isolated by different methods from unbilical cord, skin, vitreous humor, synovial fluid, tumors and haemolytic streptococci.

All prior methods of obtaining hyaluronic acid have yielded preparations of low to medium viscosity. By these procedures the hyaluronic acid preparations produced have had relative viscosities at concentrations of 1 gram per liter in the range of 1.1 to 4.3. These conventional methods have involved precipitation with several volumes of alcohol or acetone, and are inconvenient because of the bulk of liquid. For example, 100 g. of dry, washed cords will give 6 l. of extracts which will result in 30 l. of liquid when precipitated.

We have discovered methods of producing hyaluronic acid which consistently yield fractions of hyaluronic acid preparations having relative viscosities of 8 or greater. Our methods comprise extracting acetone-washed unbilical cords with dilute salt solution, acidifying the resulting extract, removing the clot so formed, precipitating some hyaluronic acid with considerable protein from the acidified extract with ammonium sulfate, agitating the liquor with pyridine thus precipitating another fraction highly contaminated with protein, followed by more ammonium sulfate which forces some pyridine out of solution along with the high viscosity hyaluronic acid. The latter collects at the interface between the two liquid phases and may be separated by filtration, centrifugation or other usual procedure. A modification of this process involves the fractionation of the acidic salt extract from cords with alcohol and ammonium sulfate. Alcohol is added to the acidic salt extract, and the resulting precipitate is removed. Solid ammonium sulfate is added to the liquid until saturation and the solution forms two phases, with a precipitate of hyaluronic acid at the interface.

The modified process involves large volumes of fluid and therefore is somewhat less advantageous than the first procedure described hereinabove. For certain sources of hyaluronic acid, however, it is the preferred method.

As starting material for our process, we use umbilical cords from humans, cattle, pigs and other animals. Our viscous preparations contain 9–11% of acetyl, 2.8–4.3% of nitrogen (by Kjeldahl determination), 0.05% or less of phosphorus, 0–1% of sulfur (generally 0.5–1%) and 34–38% of glucosamine. Analyses are done on samples the dried weight of which was determined by drying at 100° C. in vacuum over sulfuric acid. In some instances the values of acetyl, nitrogen and glucosamine are sometimes lower in our analyses, which may be due to the moisture content of our samples.

Relative viscosity as used herein means the ratio of flow time of a given concentration of hyaluronic acid in a salt solution to that of the salt solution alone. The value of the relative viscosity at a standard concentration of 1 g./l. is derived from the relation $$V = 1 + \frac{V' - 1}{C}$$

wherein V is the relative viscosity at a concentration of 1 g./l., V' is the relative viscosity at a given concentration and C is the given concentration expressed in grams per liter. Viscosity measurements are made in Ostwald viscosimeters with capillaries 9 cm. long and having flow times of about 30 seconds for 4 ml. of water. This volume is used in all the measurements, which are made at 25° C. The standard ionic environment is 0.05 molar salt and 0.05 molar phosphate buffer at pH 7.0.

The hyaluronic acid preparations obtained by precipitation with pyridine as in Example 1 are highly viscous. Solutions containing 0.3 g./l. have, before removal of residual protein by shaking with chloroform and amyl alcohol, relative viscosities in salt of 2.2 to 2.5. After protein is removed, the relative viscosities are in the range of 1.7 to 2.0 for 0.3 g./l. The relationship between viscosity and concentration is non-linear. With viscous preparations of hyaluronic acid, an increase in the concentration from 0.3 to 0.6 g./l. increases the viscosity increment 3-4 fold. Solutions containing 1 g./l. have relative viscosities of more than 8.

Our invention is further disclosed by the following examples which are intended only as illustrations of our invention and in no way limit it in scope.

Example 1

Human umbilical cords are washed carefully and then preserved in acetone. After lying for 1-6 weeks in acetone they are cut up into pieces not more than 1 cm. long and extracted for a few more days with fresh acetone. The acetone is then drained off as completely as possible and the cords are extracted with successive lots of water, using about four times the cords' wet weight of water for each extraction and leaving each one for at least 2 hours. The first two extracts contain little but acetone and may be thrown away, but following extracts bring out some hyaluronic acid accompanied by much protein. These extracts therefore give a mucin clot on acidification; they are combined and extraction is continued until the amount of clot is small. Five to eight extractions may be necessary. The combined extracts are taken to pH 3 and the clot collected so that it can be worked up for hyaluronic acid along with other fractions grossly contaminated with protein.

The residue is passed through a power driven meat grinder with ⅛" holes in the plate. The ground material is suspended in three volumes of approximately 0.1 M NaCl (to reduce the viscosity), and after some hours it is poured into a cloth and the fluid is expressed by hand.

The extraction is repeated twice, each time allowing the new NaCl solution to lie in contact with the cord for at least 12 hours. This work is carried out in a cold room or the fluids should be kept saturated with chloroform at all times.

For each liter of the combined extracts 20 ml. of 5N HCl is added with thorough stirring. If the initial washing of the cords was adequate there will be only a small precipitate. This is stirred gently and intermittently during some hours until it coalesces into a string, which is removed and added to the mucin clot fraction.

Hyaluronic acid can be precipitated from this fluid in several different ways. Precipitation with several volumes of alcohol or acetone is inconvenient because of the bulk of the fluid involved. Two alternative precipitation procedures, disclosed hereinbelow, are preferred.

300 g. of ammonium sulfate are added to each l. of the clear acid fluid. Purified hyaluronic acid is not prepicitated by ammonium sulfate but the residual protein in the solution precipitates and brings out some hyaluronic acid with it. The precipitate that separates entangles air forced out of the solution by the salt; this is convenient for it is easier to allow the mixture to stand till all the solid has collected at the top, siphon off the subnatant fluid, and compact the solid scum by centrifuging, than to deaerate and centrifuge down the precipitate. To each l. of fluid 50 ml. of pyridine are added and the mixture is agitated or shaken vigorously; some of the pyridine remains undissolved in the ammonium sulfate solution and a little solid separates at the interface. The mixture is allowed to settle, the clear fluid is siphoned off and the interfacial material is compacted by centrifuging. This centrifuging should be done in a closed apparatus so that the pyridine does not evaporate because the pellicle remains insoluble only if some pyridine phase is present. The pellicle generally contains little hyaluronic acid. A further 250 g./l. of ammonium sulfate are now added. This forces more pyridine out of solution and it brings with it hyaluronic acid which stays on the interface between the two liquids. On centrifuging in closed vessels, it becomes a compact coherent sheet that can be lifted out of the centrifuge tube with a pair of forceps. The purified hyaluronic acid thus isolated has a relative viscosity of 8.2 at a concentration of 1.0 g./l. at 25° C. in 0.05 M NaCl and 0.5 M phosphate buffer at pH 7.

Approximately equal amounts of hyaluronic acid are present in the original ammonium sulfate precipitate and in the second pyridine pellicle, but the former may contain as much as 20% of protein and the latter only 5% judging from the nitrogen content. In each case the protein can be removed by shaking with chloroform and amyl alcohol.

Example 2

A comparable method for separating hyaluronic acid from the acid cord extract involves precipitation with acid alcohol in the presence of ammonium sulfate. One and a third volumes of alcohol are added to the acid fluid obtained as in Example 1; a fine gelatinous precipitate separates and this is entangled with air bubbles. The whole precipitate may be sufficiently coherent to float up in an hour, thus enabling one to siphon away most of the fluid. If it fails to do this the air is removed from the precipitate by exposure to vacuum for a few minutes. The precipitate will now sink and can be centrifuged down. The precipitate is suspended evenly in water and reprecipitated by addition of 1.33 volumes of alcohol; on dialysis it goes into solution slowly as the alcohol is removed.

Solid ammonium sulfate is added to the alcoholic supernatant fluid with vigorous mechanical stirring. It dissolves slowly and about 200 g. are needed to saturate each liter. On standing, the system separates into two layers; the lower contains much ammonium sulfate and little alcohol and the upper little ammonium sulfate and much alcohol. As a rule a precipitate which is relatively uncontaminated hyaluronic acid collects on the interface. When separation has proceeded so far that both liquid layers are clear, as much of each as possible is siphoned off and the interfacial material collected by packing it into a coherent felt by centrifuging. It packs very tightly when centrifuged and should be diluted with water before dialysis for otherwise a rigid jelly will be formed that dialyzes very slowly. The proportion in which these two fractions appear varies from preparation to preparation; there is always an alcohol precipitate but sometimes little or no material separates on the addition of ammonium sulfate.

Residual protein is removed from these fractions, as from the pyridine fractions, by shaking with chloroform and amyl alcohol. For effective removal of protein from these viscous solutions the concentration must be kept low. Solutions of crude hyaluronic acid containing less than 2 g./l. at pH 4 in the presence of 0.1 to 0.5 M salt are shaken briskly with a mixture of one part chloroform to two of amyl alcohol and then centrifuged. The aqueous solution is shaken again, this time mechanically, with fresh solvent. As a rule little or no emulsion is made on this second shaking. After acidification with HCl the fluid can be either dialyzed directly or precipitated with 1.3 volumes of alcohol and then dialyzed in a smaller volume of water. In the latter case precipitation will be incomplete but this is an advantage because the unprecipitated material has a lower viscosity than that precipitated. The unprecipitated hyaluronic acid can be recovered as an interfacial precipitate by adding ammonium sulfate. The yield of purified material, by either of the two methods (of Examples 1 and 2), is 1-2% of the dry weight of the cords. The products of either method have substantially the same properties.

*Example 3*

The cord residue and the mucin clots that have been precipitated by adding acid to the extracts contain more hyaluronic acid, and this can be recovered, in a less viscous form, by digestion with proteolytic enzymes. The cord residue of the consistency at which little more can be squeezed out of it by hand is suspended evenly in about five volumes of 0.01 N HCl containing 0.5 g./l. pepsin. The pH is readjusted to 2 if it is significantly higher than this and the mixture is incubated with toluene for 24 hours at 35-40° C., preferably at about 37° C. The greater part goes into solution, leaving a pink solution and a floating curd. These are easily separated by filtration on a coarse paper at room temperature. There is sufficient gelatin liberated into the fluid to cause gelatinization if it is cooled. This pepsin extract gives an alcohol precipitate and an interfacial precipitate in much the same way as the extract from the minced cords but each has a high nitrogen content. It is preferable therefore to neutralize the pepsin extract and digest it with trypsin to destroy the protein that it contains. The cord residue is also digested with trypsin and the two extracts are combined. These digestions are carried out at 35-40° C., preferably at about 37° C., in the presence of toluene with 2 g./l. commercial trypsin for 24 hours at pH 7.6. When these trypsin-digested fluids are put through the acid: alcohol: ammonium sulfate fractionation, nothing precipitates with the concentrated HCl and very little interfacial material separates. What there is, therefore, is added to the alcohol precipitate and this precipitate is dissolved, reprecipitated, and dialyzed.

The mucin clot can be partially fractionated by precipitation with alcoholic potassium acetate in alkaline solution, but it is generally more satisfactory to incubate it with trypsin and then work up the hyaluronic acid by alcohol precipitation in the manner just outlined for the pepsin extract of the cord residue. The yields of these two products are variable but that from the pepsin extract may be as high as 4%, and that from the mucin clots 1% of the dry weight of the cords. Material from the pepsin extract has only about half the viscosity increment of the viscous fractions and that from the mucin clots is even less viscous. Slightly more viscous products can be made from these by precipitating a series of fractions with alcohol or alcoholic potassium acetate.

*Example 4*

Human umbilical cords are washed and soaked in acetone for one week. They are then cut into pieces not more than 1 centimeter long and extracted for three days with fresh acetone. The acetone washes are discarded and the cords are extracted with five portions of water, using about four times the cords' wet weight of water for each extraction, each extraction lasting at least 2 hours. The first two water extracts are discarded and the three subsequent extracts are combined and taken to pH 3 with dilute hydrochloric acid. The clot so formed is collected and suspended in about 5 volumes of 0.01 N hydrochloric acid containing 0.5 g./l. of pepsin. The pH is adjusted to 2 and the mixture is incubated with toluene for 24 hours at 37° C. The greater part of the clot dissolves leaving a pink solution and a small amount of curd. The latter is removed by filtration at room temperature. The aqueous filtrate is neutralized and then digested at 37° C. in the presence of toluene with 2 g./l. of commercial trypsin for 24 hours at pH 7.6. The digestion fluid is treated with 20 ml. of 5 N hydrochloric acid for each liter of fluid. This solution is thoroughly stirred and then treated with 1⅓ volumes of ethanol. A fine gelatinous precipitate separates which is removed by decantation or centrifugation. This material is dissolved in water and reprecipitated by addition of 1⅓ volumes of ethanol. The precipitate of hyaluronic acid is removed by decantation or centrifugation and dried. A yield of hyaluronic acid equivalent to 1% of the dry weight of the cords is obtained.

*Example 5*

Human umbilical cords are washed with water and soaked in acetone for about one week. The acetone is drained off and the cords are extracted with water for two-hour periods. The first two extracts are discarded and three additional extracts are made. The cord residue from these water extractions is comminuted and suspended in 3 volumes of 0.1 molar sodium chloride solution. After 12 hours the extract is filtered and the residue is twice extracted with fresh sodium chloride solution. These extractions are carried out in the cold. The residue from the sodium chloride extractions is then suspended in 5 volumes of 0.01 N hydrochloric acid containing pepsin in a concentration of 0.5 g./l. The pH is brought to 2 and the mixture is incubated in the presence of a small amount of toluene for 24 hours at 37° C. The solution is then filtered at room temperature to remove curd and digested with trypsin as in Example 4. The hyaluronic acid is liberated from the trypsin digestion fluid by the method of Example 4. A yield of hyaluronic acid equivalent to 4% of the dry weight of the cords is thus obtained.

We claim:

1. The process of recovering hyaluronic acid from a mixture of hyaluronic acid and protein which comprises incubating said mixture with a proteolytic enzyme at 35-40° C., precipitating the hyaluronic acid with alcoholic hydrochloric acid followed by ammonium sulfate and removing the ionic material by dialysis.

2. The process of recovering hyaluronic acid from a mixture of hyaluronic acid and protein which comprises suspending said mixture in dilute aqueous acid containing pepsin, incubating the resulting suspension at 35-40° C., removing the insoluble material, neutralizing the solution, incubating said solution with trypsin at 35-40° C., precipitating the hyaluronic acid with alcohol and hydrochloric acid followed by ammonium sulfate, and removing the ionic materials by dialysis.

3. The process of recovering hyaluronic acid from a mixture of hyaluronic acid and protein which comprises suspending said mixture in dilute aqueous acid containing pepsin, incubating the resulting suspension at 37° C., removing the insoluble material, neutralizing the solution, incubating said solution with trypsin at 37° C., precipitating the hyaluronic acid with alcohol and hydrochloric acid followed by ammonium sulfate, and removing the ionic materials by dialysis.

4. The process of producing high viscosity hyaluronic acid which comprises extracting umbilical cords with salt solution, acidifying the resulting extract, removing the clot so formed, digesting the residue with a proteolytic enzyme at 35–40° C., precipitating the hyaluronic acid with alcoholic hydrochloric acid followed by ammonium sulfate, and removing the ionic materials by dialysis.

5. The process of producing high viscosity hyaluronic acid which comprises extracting umbilical cords with salt solution, acidifying the resulting extract, removing the clot so formed, digesting the residue with a proteolytic enzyme at 35–40° C., precipitating the hyaluronic acid with alcoholic hydrochloric acid followed by ammonium sulfate, and removing the ionic materials by dialysis.

ZAREH HADIDIAN.
NORMAN W. PIRIE.

REFERENCES CITED

The following references are of record in the file of this patent:

UNITED STATES PATENTS

| Number | Name | Date |
|---|---|---|
| 2,097,481 | Wallerstein | Nov. 2, 1937 |
| 2,410,084 | Kuizenga | Oct. 29, 1946 |

OTHER REFERENCES

Science, Aug. 16, 1943 (vol. 98), p. 160.

Meyer et al., 34 Chemical Abstracts (1940), 2002; (J. Exptl. Med. 71, 137–46; 1940).

McIlroy, The Chemistry of the Polysaccharides, 1948, p. 113.